United States Patent
Han et al.

(10) Patent No.: US 9,913,301 B2
(45) Date of Patent: Mar. 6, 2018

(54) CONTENT SHARING METHOD AND DEVICE

(71) Applicant: Wistron Corporation, New Taipei (TW)

(72) Inventors: Yen-Kang Han, New Taipei (TW); Po-Hsu Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 275 days.

(21) Appl. No.: 14/572,789

(22) Filed: Dec. 17, 2014

(65) Prior Publication Data

US 2016/0094648 A1    Mar. 31, 2016

(30) Foreign Application Priority Data

Sep. 29, 2014 (TW) .................................. 103133747

(51) Int. Cl.
*G06F 15/16* (2006.01)
*H04W 76/02* (2009.01)
*H04W 4/00* (2018.01)

(52) U.S. Cl.
CPC ............ *H04W 76/02* (2013.01); *H04W 4/008* (2013.01); *G09G 2300/026* (2013.01); *G09G 2370/16* (2013.01)

(58) Field of Classification Search
CPC .......................... H04L 67/1051; H04W 76/02
USPC ......................................................... 709/209
See application file for complete search history.

(56) References Cited

U.S. PATENT DOCUMENTS

| 9,392,315 B1* | 7/2016 | Lang .................. H04N 21/4122 |
| 2013/0128017 A1* | 5/2013 | Seo ..................... H04N 13/0438 348/56 |
| 2013/0238702 A1* | 9/2013 | Sheth ..................... H04L 67/38 709/204 |

(Continued)

FOREIGN PATENT DOCUMENTS

| CN | 103139586 | 6/2013 |
| EP | 2424309 | 12/2013 |
| EP | 2424309 B1 * | 12/2013 |

OTHER PUBLICATIONS

"Office Action of Taiwan Counterpart Application," dated Nov. 17, 2015, with English translation thereof, pp. 1-11, in which the listed references were cited.

*Primary Examiner* — Glenford Madamba
(74) *Attorney, Agent, or Firm* — JCIPRNET

(57) ABSTRACT

A content sharing method for a first electronic device is provided. The method includes: scanning several wireless signals and determining several slave electronic devices sending the wireless signals; according to the wireless signals, calculating a wireless signal strength corresponding to each slave electronic device; and according to the wireless signal strengths of the slave electronic devices, choosing a first slave electronic device among the slave electronic devices, wherein the wireless signal strength of the first slave electronic device is stronger than the wireless signal strengths of the other wireless signal strengths among the wireless signal strengths. The method further includes: building up a connection to the first slave electronic device; and, through the connection, automatically sending a content played in the first electronic device to the first slave electronic device and synchronously displaying the content on the first slave electronic device.

18 Claims, 12 Drawing Sheets

(56) References Cited

U.S. PATENT DOCUMENTS

2015/0109198 A1* 4/2015 Liu ................ G06F 3/1454
  345/156
2015/0326704 A1* 11/2015 Ko ................ H04M 1/7253
  455/456.3

* cited by examiner

CONTENT SHARING METHOD AND DEVICE

CROSS-REFERENCE TO RELATED APPLICATION

This application claims the priority benefit of Taiwan application serial no. 103133747, filed on Sep. 29, 2014. The entirety of the above-mentioned patent application is hereby incorporated by reference herein and made a part of this specification.

BACKGROUND OF THE INVENTION

1. Field of the Invention

The invention relates to a data sharing method, and particularly relates to a content sharing method for automatically sharing contents played in an electronic device for another electronic device to play through wireless connection and a device using the same.

2. Description of Related Art

With the rapid development of the wireless communication technology, the transmission quality and bandwidth for synchronously displaying video/image are also constantly increased. As a result, the applications of display mirroring technology such as WiFi Display, AirPlay, Wireless Display (WiDi), and Mircast of WiDi are becoming more and more popular. The display mirroring technology serves to synchronously display a display frame of a source end on an electronic device, such as laptop computer, smart TV, smartphone, or laptop computer, of a sink end based on WiFi or other wireless transmission technology. Therefore, the user may use the display mirroring technology to share information contents to be shared with other users.

Generally speaking, in the conventional display mirroring technology, if the user wishes to share a multimedia content, he/she needs to execute a multimedia player and an operation of screen mirroring to complete the operation of sharing the multimedia content. Thus, it requires complicated processes for the user to share the content by using the conventional display mirroring technology, and the processes are thus not convenient.

SUMMARY OF THE INVENTION

The invention provides a content sharing method and a device using the content sharing method, which are capable of automatically transmitting a content played in an electronic device to another electronic device and displaying the transmitted content on the another electronic device.

The invention provides a content sharing method for a master electronic device. The method includes scanning a plurality of wireless signals and identifying a plurality of slave electronic devices sending the wireless signals, wherein each of the wireless signals is sent from one of the slave electronic devices. The method further includes: calculating a wireless signal strength corresponding to each of the slave electronic devices according to the wireless signals; and choosing a first slave electronic device among the slave electronic devices according to the wireless signal strengths of the slave electronic devices, wherein among the wireless signal strengths, the wireless signal strength corresponding to the first slave electronic device is stronger than rest of the wireless signal strengths. Moreover, the method also includes: building up a wireless connection with the first slave electronic device; and automatically transmitting a content played in the master electronic device to the first slave electronic device through the wireless connection, and synchronously displaying the content on the first slave electronic device.

The invention provides a content sharing device, including a display unit, a communication unit, and a content sharing unit. The content sharing unit is coupled to the display unit and the communication unit. The content sharing unit is configured to instruct the communication unit to scan a plurality of wireless signals and identify a plurality of electronic devices sending the wireless signals, and each of the wireless signals is sent from one of the electronic devices. In addition, the content sharing unit is further configured to calculate a wireless signal strength corresponding to each of the slave electronic devices according to the wireless signals, and choose a first slave electronic device among the slave electronic devices according to the wireless signal strengths of the slave electronic devices. Among the wireless signal strengths, the wireless signal strength corresponding to the first slave electronic device is stronger than rest of the wireless signal strengths. The content sharing unit is further configured to instruct the communication unit to build up a wireless connection with the first slave electronic device. Also, the content sharing unit is further configured to automatically transmit a content played in the master electronic device to the first slave electronic device through the wireless connection and synchronously display the content on the first slave electronic device.

Based on the above, the content sharing unit of the invention looks for the slave electronic devices available for connection through the communication unit. The content sharing unit also chooses the second slave electronic device to be projected and builds up the wireless connection according to a selecting operation of the user of the master electronic device on the display unit of the master electronic device. In this way, the user is able to synchronously display the content (video, music, images, webpages, etc.) displayed on the master electronic device on the slave electronic device.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
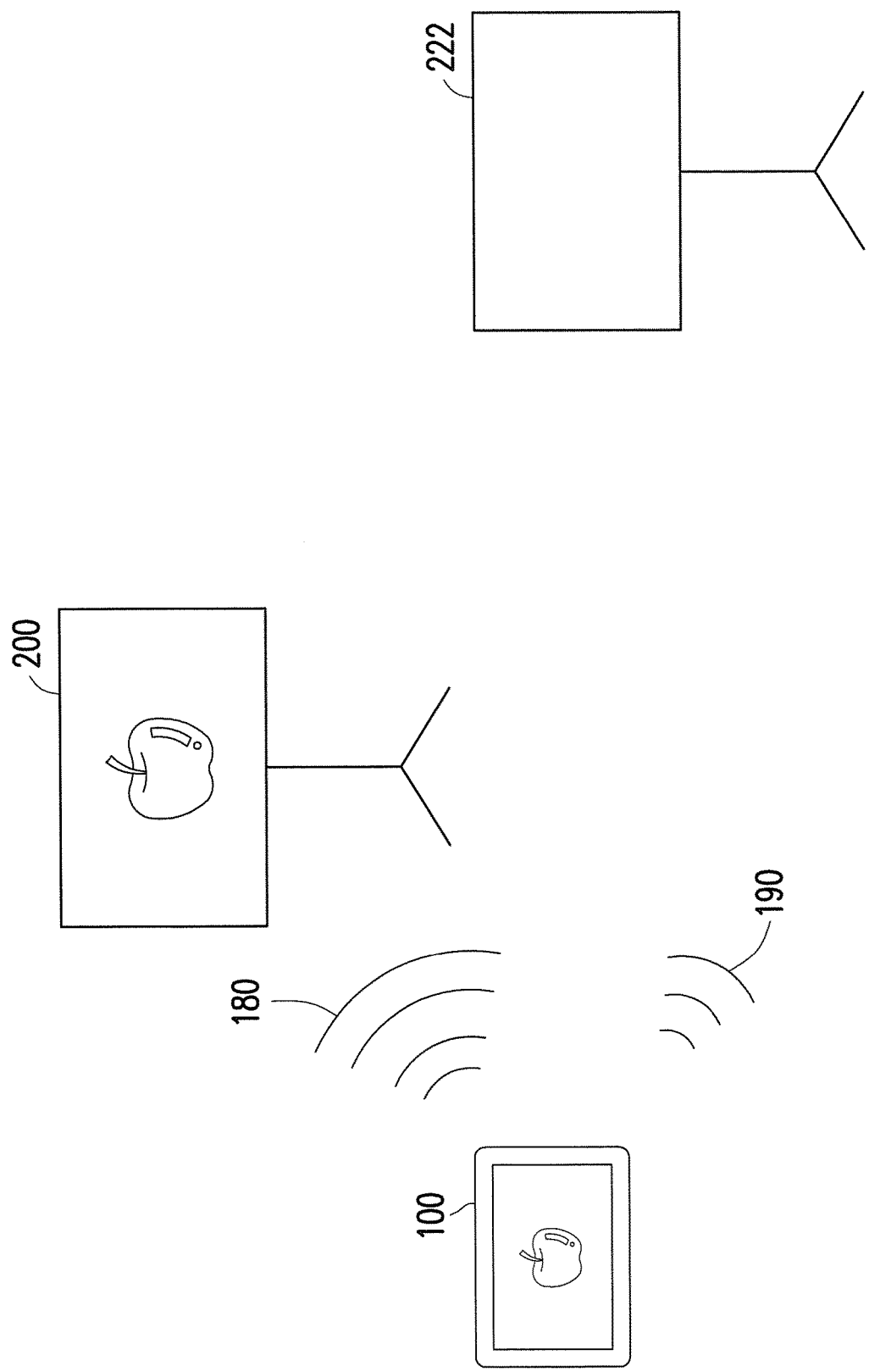
FIG. 1A is a schematic view illustrating operation of a content sharing method according to an exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Details of exemplary embodiments are described in the following. However, the specific structures and details of functions only serve to describe the exemplary embodiments. The exemplary embodiments may also be embodied in various replacing forms and shall not be deemed as being limited to the embodiments described herein.

In the technology of WiFi Display, a master electronic device (also called "source end device" or "content sharing device") may build up a wireless session connection with a slave electronic device (also called "sink end electronic device"). In this way, the master electronic device may transmit a screen frame to the slave electronic device through the connection. Here, the master and salve electronic devices may be the same or different electronic devices.

Figure 1B:
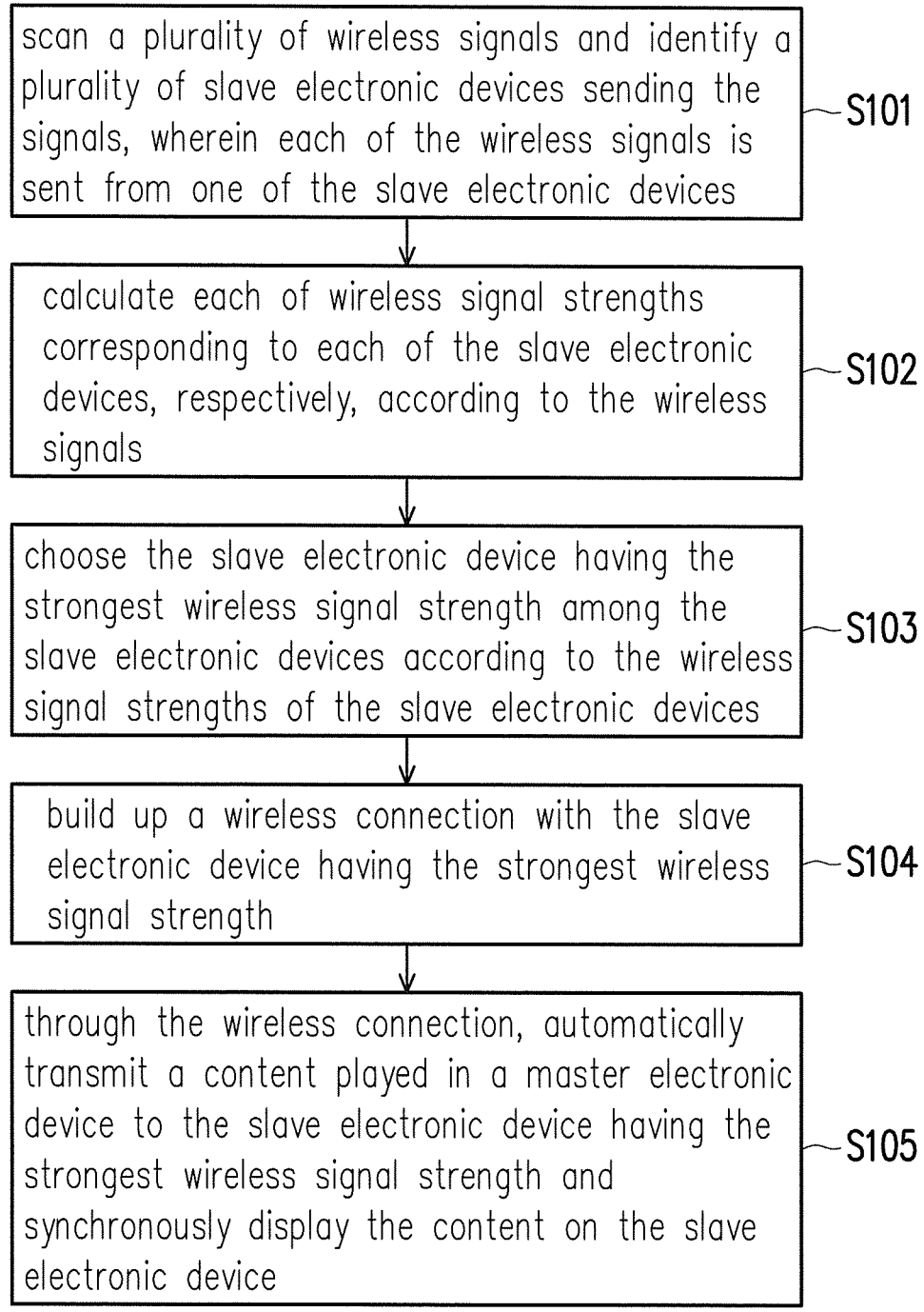
FIG. 1B is a schematic flowchart illustrating a content sharing method according to an exemplary embodiment of the invention.

FIG. 1A is a schematic view illustrating operation of a content sharing method according to an exemplary embodiment of the invention, and FIG. 1B is a schematic flowchart illustrating a content sharing method according to an exemplary embodiment of the invention.

Referring to FIGS. 1A and 1B at the same time, for the purpose of automatically transmitting a content played in the master electronic device to the slave electronic device and synchronously displaying the content on the slave electronic device, a master electronic device 100 may scan a plurality of wireless signals and identify a plurality of salve electronic devices sending the wireless signals. In addition, each of the wireless signals is sent from one of the slave electronic devices (S101). Then, the master electronic device may calculate each of wireless signal strengths corresponding to each of the slave electronic devices (S102), respectively, and choose the slave electronic device having the strongest wireless signal strength among the slave electronic devices according to the wireless signal strengths of the slave electronic devices (S103). For example, assuming that the master electronic device 100 (or the content sharing device 100) scans wireless signals sent from slave electronic devices 200 to 222, and determines that a strength of a wireless signal 180 sent from the slave electronic device 200 is stronger than a strength of a wireless signal 190 sent from the slave electronic device 222. Accordingly, the master electronic device 100 may choose the slave electronic device 200 as a target slave electronic device for content sharing. Then, the master electronic device 100 may build up a wireless connection with the slave electronic device 200 having the strongest wireless signal strength (S104), and, through the wireless connection, a content played in the master electronic device 100 is automatically transmitted to the slave electronic device 200 having the strongest wireless signal strength and synchronously displayed on the slave electronic device 200 (S105). As shown in FIG. 1A, the master electronic device 100 and the first slave electronic device 200 display the same picture having an apple. It should be noted that the content is not limited to a display frame, the content may also be video, audio, photo, web contents etc., which may be played.

In this exemplary embodiment, the concept of the invention is mainly described by using the master electronic device as the source end for content sharing, and using the slave electronic device (i.e., the first slave electronic device) that is chosen as the sink end for content sharing. The method based on the invention may be implemented and applied in a variety of aspects of our daily lives. Taking teaching as an example, an electronic whiteboard may serve as a source end apparatus for sharing a frame and receiving a user input back channel (UIBC) command, or may even serve as a sink end apparatus to receive a frame shared by other electronic devices (tablet computers). In addition, after the master electronic device builds up a user input back channel (UIBC) session with a user of the first slave electronic device, the master electronic device may receive a plurality of control signals from the first slave electronic device through the UIBC session, and the master electronic device controls the content played in the master electronic device according to the control signals. In the following, a plurality of embodiments conforming to the spirit of the invention are provided. Those who practice the embodiments may appropriately modify the embodiments according to their needs, and are not limited to the following description.

Figure 2A:
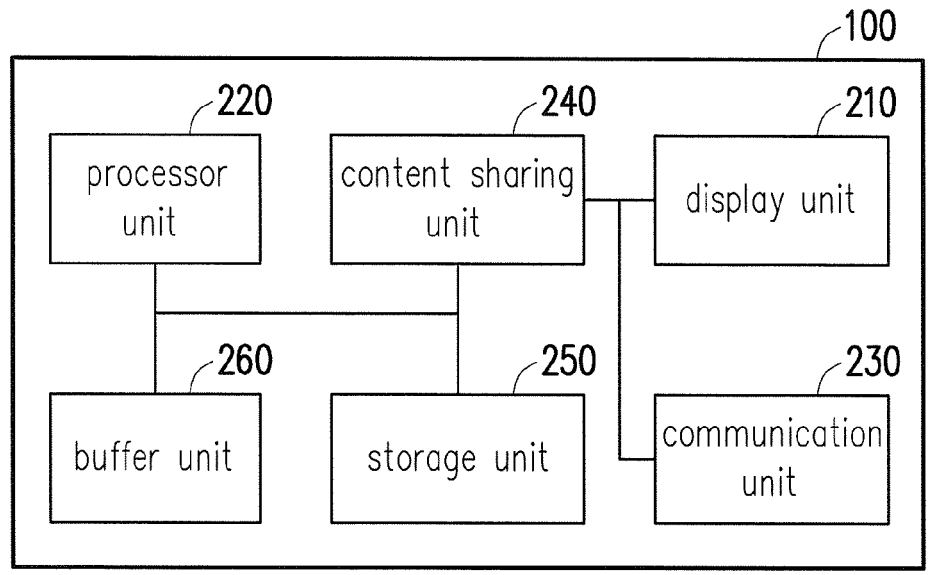
FIG. 2A is a block diagram illustrating a content sharing device according to an exemplary embodiment of the invention.

FIG. 2A is a block diagram illustrating a content sharing device according to an exemplary embodiment of the invention. In the following, for the ease of description, the master electronic device 100 serves to represent the content sharing device of the content sharing method according to the invention.

Referring to FIG. 2A, the master electronic device 100 includes a display unit 200, a processor unit 220, a communication unit 230, a content sharing unit 240, a storage unit 250, and a buffer unit 260. The master electronic device 100 may be an electronic device such as an electronic whiteboard, a desktop computer, a tablet computer, a personal mobile device, etc. The invention does not intend to impose a limitation on the type of the master electronic device described in the embodiments below.

The display unit 210 is coupled to the processor unit 220, and is configured to display a desktop of an operating system of or the content played in the master electronic device 100. For example, the display unit 210 may be a liquid crystal display (LCD), a light-emitting diode (LED) display, or a field emission display (FED). The display unit 210 may also be a touch display unit formed of a display panel of other types of displays and, for example, a resistive, capacitive, or optical touch panel, and may be capable of simultaneously providing functions of display and touch control. Still, the display unit 210 may be other displays capable of providing the display function. The invention is not limited to the above.

The processor unit 220 is, for example, a central processing unit (CPU), a programmable microprocessor, a digital signal processor (DSP), a programmable controller, an application specific integrated circuit (ASIC), a programmable logic device (PLD), or other similar devices.

The communication unit 230 is coupled to the processor unit 220 and is configured to be connected to a network. The network may be a telecommunication network, the Internet, etc., for example. In this exemplary embodiment, the communication unit 230 is compatible with a WiFi communication protocol. However, the invention is not limited thereto. The communication unit 230 may also be compatible with other communication protocols. For example, the communication unit 230 is formed of a plurality of circuits, and the circuits are respectively compatible with wireless communication modules such as Bluetooth, near field communication (NFC), and the third generation partnership project (3GPP) standard.

The storage unit 250 is coupled to the processor unit 220. The storage device 250 may be a hard disk drive (HDD) or a non-volatile memory storage device of any kind.

The buffer unit 260 is coupled to the processor unit 220. The buffer unit 260 is configured to temporarily store data and commands from the processor unit 220 or the content sharing unit 240, or temporarily store data from the storage unit 250. For example, the content sharing unit 240 may temporarily store a content (data) to be transmitted by the communication unit 230 in the buffer unit 260. For example, the buffer unit 260 may be a random access memory (RAM).

The content sharing unit 240 is coupled to the processor unit 220. In this exemplary embodiment, the content sharing unit 240 is configured to manage and control a content-sharing-related operation of the master electronic device 100 of the exemplary embodiment.

Figure 2B:
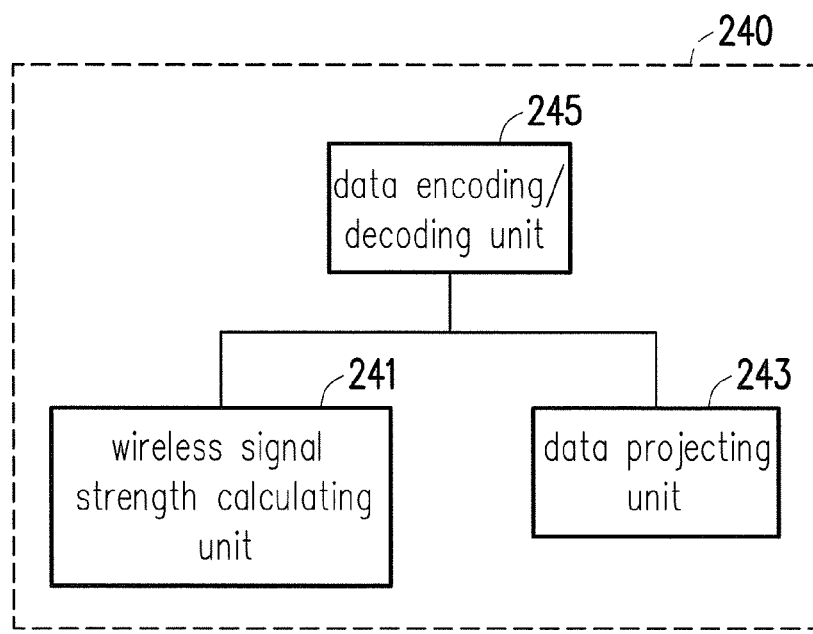
FIG. 2B is a block diagram illustrating a content sharing unit according to an exemplary embodiment of the invention.

FIG. 2B is a block diagram illustrating a content sharing unit according to an exemplary embodiment of the invention. Referring to FIG. 2B, the content sharing unit 240 includes a wireless signal strength calculating unit 241, a data projecting unit 243, and a data encoding/decoding unit 245.

The wireless signal strength calculating unit 241 is configured to calculate the wireless signal strengths of the plurality of wireless signals that are received. In this exemplary embodiment, the wireless signal strength calculating unit 241 may calculate distances of the plurality of slave electronic devices sending the wireless signals from the master electronic device according to the wireless signals that are received. According to the calculated distances, it is set that a slave electronic device having a shorter distance from the master electronic device has a stronger wireless signal strength. For example, the wireless signal strength calculating unit 241 calculates the distances to the slave electronic devices that are found by calculating a data packet exchange time of the wireless signal from each of the slave electronic devices that is found. In another exemplary embodiment, the wireless signal strength calculating unit 241 may calculate a WiFi received signal strength indicator/indication (WiFi RSSI hereinafter) of the wireless signal. The WiFi RSSI represents a numerical value of a WiFi wireless signal.

The WiFi wireless signal strength sent by each of the slave electronic devices that are found may be known according to the value of WiFi RSSI. A stronger WiFi wireless signal indicates that a wireless connection quality is more preferable when a wireless connection between the master electronic device builds up the wireless connection with the slave electronic device having the stronger WiFi wireless signal.

A data projecting unit 243 is configured to choose a content to be captured and shared. More specifically, after the master electronic device 100 builds up a wireless connection with a slave electronic device to be shared with the content, the data projecting unit 243 captures the content played in the master electronic device 100 and projects the captured content to the connected slave electronic device through the communication unit 230.

The data encoding/decoding unit 245 is configured to perform an encoding operation to the content captured by the data projecting unit 243. The content after the encoding operation is also called encoded data. The encoding operation includes performing a compression or encryption operation to the content. The invention does not intend to impose a limitation on the way encoding is performed in the encoding operation. The data encoding/decoding unit 245 may also perform a decoding operation to encoded data. For example, compressed encoded data may be decompressed to be restored to a data state before compression.

In this exemplary embodiment, when the content sharing unit 240 activates a source end mode (or turn on a WiFi mode), the content sharing unit 240 may perform a device scanning process for device discovery through the communication unit 230 according to a communication technology compatible with the communication unit 230, so as to look for slave electronic devices compatible with the communication technology compatible with the communication unit 230. For example, a peer-to-peer (P2P) detection process may be performed for the slave electronic devices, such that the master device 100 and the slave electronic devices exchange P2P information (e.g., media access control address, Internet protocol (IP) address, group owner/client information, P2P information element) and device types thereof to each other.

In an exemplary embodiment, for example, in the operation of exchanging the P2P information thereof, a P2P master/slave communication may also be performed. Namely, which of the two electronic devices to be connected is the master device and which of the two electronic devices to be connected is the slave device may be confirmed. For example, two mobile devices (e.g., tablet computers) may automatically decide which of the devices the master device is by determining which of the devices initiates the connection or by triggering a specific button. In addition, the master device determines contents displayed on the devices. For example, after the master electronic device 100 and the first slave electronic device 200 perform the P2P master/slave communication, the master electronic device 100 is determined as the master device, and the content of the master electronic device 100 is displayed on the first slave electronic device 200. In another exemplary embodiment, the user may trigger a specific button (not shown) to set that the first slave electronic device 200 is the master device, and the content displayed on the first slave electronic device 200 is displayed on the master electronic device 100.

In an exemplary embodiment where the master electronic device 100 is based on the WiFi Display (WFD) technology, the user may switch the master electronic device 100 to a source end mode to turn on a WFD function by pressing or touching a virtual or physical button (e.g., a "WFD SRC" button) representing the source end, or the discovery process may be directly performed when the user turns on a WiFi function of the master electronic device, so as to look for a plurality of slave electronic devices compatible with a WiFi Direct function in a nearby area available for communication and identify the wireless signal strengths of the wireless signals sent from the slave electronic devices that are found (or detect the distances between the slave electronic devices and the master electronic device). Moreover, in another exemplary embodiment, the user may also switch the master electronic device 100 to a sink end mode by pressing or touching a virtual or physical button (i.e., "WFD SNK" button) representing a sink end. Then, the master electronic device 100 performs the discovery process to send a wireless signal to the nearby area available for communication and receive contents from the source end device.

In another exemplary embodiment, the master electronic device 100 further displays a WFD functional interface, so that the user may determine through the interface whether to start the operations of looking for the slave electronic devices available for the WiFi connection and detecting the wireless signal strength of each slave electronic device. For example, if the WFD function of the master electronic device is turned on, the master electronic device then performs the content sharing operation. If the WFD function of the master electronic device is turned off, the master electronic device only performs a regular connection function available when WiFi is turned on, but does not perform the content sharing operation.

In this exemplary embodiment, when receiving an instruction from the content sharing unit 240, the communication unit 230 knows the slave electronic device (i.e., the first slave electronic device) to build up a connection with among the slave electronic devices that are found. Then, the communication unit 230 starts the operation of building up the wireless connection. In an exemplary embodiment, the wireless connection is a WiFi Direct connection. Meanwhile, the communication unit 230 establishes a wireless connection with each client device by using the WiFi Direct technology, and projects contents to another connected device or receives contents projected from other devices through a Miracast technology. Here, the Miracast technology was set by the WiFi Alliance in 2012, and is a wireless display standard based on the WiFi Direct technology. A device compatible with the Mircast standard may share a video frame through a wireless connection. For example, a cell phone may directly play a video or image on a TV set or other devices through Miracast without any connecting line, and it does not require an access point (AP) to share a content such as a video frame, either.

In this exemplary embodiment, during the operation where the content sharing unit 240 instructs the communication unit 230 to build up the wireless connection with the first slave electronic device, the content sharing unit 240 further determines whether the master electronic device 100 already stores a personal identification code (PIN) corresponding to the first slave electronic device 200. If the content sharing unit 240 identifies that the master electronic device 100 does not store the personal identification code corresponding to the first slave electronic device 200, the content sharing unit 240 then transmits a personal identification code request to request the user's input and receive the personal identification code corresponding to the first slave electronic device 200 through the user's input. If the master electronic device 100 already stores the personal identification code corresponding to the first slave electronic device, the content sharing unit 240 then instructs the communication unit 230 to build up the wireless connection with the first slave electronic device 200 by using the personal identification code corresponding to the first slave electronic device 200.

In another exemplary embodiment, when the master electronic device 100 builds up the wireless connection with the first slave electronic device 200, the content sharing unit 240 of the master electronic device 100 records the first slave electronic device 200 that has built up the wireless connection in a list (e.g., a trusted list, or a connection history list), and the content sharing unit 240 also allows the user to choose the first slave electronic device 200 from the trusted list or the connection history list to build up the wireless connection. In addition, the trusted list or the connection history list may also serve for checking, so as to skip the operation of determining whether the master electronic device 100 already stores the personal identification code corresponding to the first slave electronic device 200. For example, when the first slave electronic device 200 is already present in the established trusted list or the connection history list, the content sharing unit 240 then instructs the communication unit 230 to directly build up the wireless connection with the first slave electronic device 200 chosen to build up the wireless connection with.

Besides, in another exemplary embodiment, the wireless connection with the first slave electronic device 200 may be built up by performing a push button configuration (PBC) confirmation operation. For example, the user may confirm whether to build up the connection with each other by triggering a physical/virtual button disposed on the main electronic device 100 and/or the first slave electronic device 200. Alternatively, in another exemplary embodiment, the master electronic device 100 and the first slave electronic device 200 may input a common security code for security certification of the wireless connection. For example, the security certification is identified as passed and the connection to each other is thus built up if one or both of the master electronic device 100 and the first slave electronic device 200 input the correct common security code.

In an exemplary embodiment, if the operation (e.g., the PBC confirmation operation) of determining whether the master electronic device 100 stores the personal identification code corresponding to the first slave electronic device 200 fails (e.g., no response is received from the electronic device), the content sharing unit 240 then performs the operation of scanning the plurality of wireless signals and identifying the plurality of first slave electronic devices 200 sending the wireless signals again, or choosing another first slave electronic device 200 having the second strongest wireless signal strength as the first slave electronic device 200 to build up the connection.

In this exemplary embodiment, the content sharing unit 240 chooses the slave electronic device having the strongest wireless signal strength to build up the connection according to the wireless signal strengths of the first slave electronic devices 200 that are found. However, the invention is not limited thereto. In another exemplary embodiment, the content sharing unit 240 may further create a slave electronic device list according to the wireless signals and the first slave electronic devices 200 sending the wireless signals. For example, in an exemplary embodiment, contents of the slave electronic device list may include, but are not limited to, identification codes for identifying the slave electronic devices, the distances from the slave electronic devices to the master electronic device, and the wireless signal strength value of each of the slave electronic devices, etc. Then, the content sharing unit 240 determines whether any of the slave electronic devices on the slave electronic device list is chosen by the user. If the content sharing unit 240 identifies that the user chooses a slave electronic device (the second slave electronic device hereinafter) from the slave electronic device list, the content sharing unit 240 then instructs the communication unit 230 to build up a wireless connection with the second slave electronic device. More specifically, if the master electronic device 100 already builds up the connection with the slave electronic device (i.e., the first slave electronic device) chosen according to the wireless signal strength, the content sharing unit 240 then instructs the communication unit 230 to disconnect from the first slave electronic device.

It should be noted that description concerning the operations of the "first" slave electronic device in the following is also applicable to the "second" slave electronic device. Similarly, description concerning the wireless connection corresponding to the first slave electronic device is also applicable to the wireless connection corresponding to the second slave electronic device. Thus, no further details in this respect will be reiterated in the following.

In an exemplary embodiment, the content sharing unit 240 may automatically transmit the content played in the master electronic device to the first slave electronic device to be synchronously played in the first slave electronic device through the wireless connection. In other words, when the wireless connection with the first slave electronic device is built up, the data projecting unit 243 of the content sharing unit 240 may automatically instruct the communication unit 230 to capture the current display frame of or the content currently displayed on the main electronic device through the communication unit 230 without the user's operating instruction. The captured data (content) are then encoded by the data encoding/decoding unit 245, and thus become the encoded data. The data projecting unit 243 then transmits the encoded data to the first slave electronic device through the communication unit 230. After receiving the encoded data through the wireless connection that is built up, the first slave electronic device decodes the encoded data and then automatically displays the data in a display unit of the first slave electronic device synchronously.

For example, the communication unit 230 may build up the connection with the first slave electronic device, and the content sharing unit 240 may capture the content displayed on the master electronic device, then decode/encode the captured content (i.e., the first frame) displayed on the master electronic device 100. Then, the content sharing unit 240 builds up an Internet protocol (IP), user data protocol (UDP), real-time transmission protocol (RTP), or real-time streaming protocol (RTSP) session with the first slave electronic device through the communication unit 230, so that the content played in the master electronic device 100 is streamed to the first slave electronic device 200. More specifically, the communication unit 230 may utilizes connection setup and capability negotiation processes to build up a peer-to-peer connection (e.g., sequentially building up an IP connection at a network layer, a transmission control protocol connection or a user data protocol (UDP) connection at a transport layer, etc.) between the master electronic device 100 and the first slave electronic device 200. Then, the content sharing unit 240 determines parameters for audio and video transmission, such as a video specification (e.g., resolution, frame rate, etc.), audio specification (e.g., sampling rate, etc.), etc. Then, the communication unit 230 may build up a RTSP session with the first slave electronic device 200 on the wireless connection that is built up. Afterwards, the content sharing unit 240 may perform an encoding process (encoding with MPEG2-TS, for example) to the first frame according to the parameters (e.g., audio and video specifications) required in each connection session, and stream the encoded first frame to the first slave electronic device 200 through the communication unit 230 based on an audio and video streaming control. Thus, the master electronic device 100 may mirror the first frame to the first slave electronic device 200 according to the built up connection session. It should be noted that the embodiment is not limited to the process for building up a connection according to WiFi Display communication. The invention may also be used in processes of building up a connection according to other communication protocol.

Figure 3:
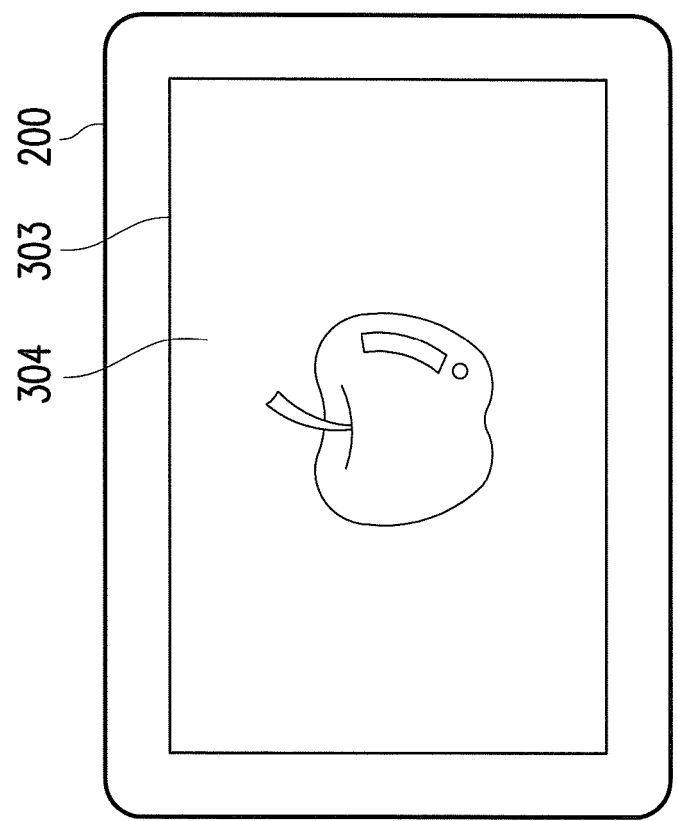
FIG. 3 is a schematic view illustrating a content sharing method according to an exemplary embodiment of the invention.
Figure 3:
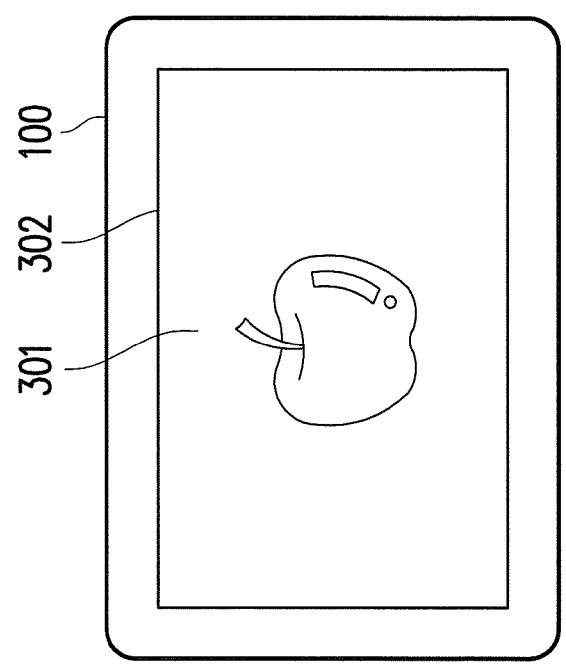

FIG. 3 is a schematic view illustrating a content sharing method according to an exemplary embodiment of the invention.

Referring to FIG. 3, in this exemplary embodiment, the content sharing unit 240 executes a mirror mode, and transmits a mirror frame corresponding to a frame 301 displayed on a display screen 302 of the master electronic device 100 to the first slave electronic device 200. Accordingly, the mirror frame is simultaneously displayed on a display screen 303 of the first slave electronic device 200. The mirror frame of the frame 301 on the display screen 302 of the master electronic device 100 here refers to a replicated frame of the frame 301 displayed on the master electronic device 100. For example, when the display unit 210 of the master electronic device 100 displays the frame 301 corresponding to an operation of the master electronic device 100, the content sharing unit 240 captures all the data for displaying the frame 301, and synchronously transmits the data to the first slave electronic device 200. Thus, the display screen 303 of the first slave electronic device displays a frame 304 the same as the frame 301 of the master electronic device (as shown in FIG. 3, the master electronic device 100 and the first slave electronic device 200 synchronously display the frames 301 and 304 with the same apple). In other words, in the mirror mode, the frame 304 displayed on the first slave electronic device 200 is the same as the frame 301 displayed on the master electronic device 100.

Figure 4:
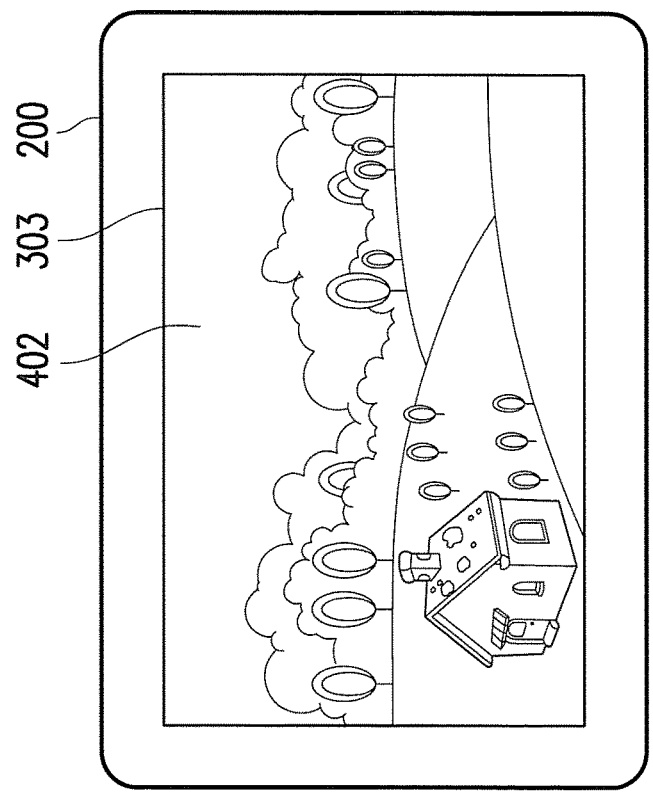
FIG. 4 is a schematic view illustrating a content sharing method according to another exemplary embodiment of the invention.
Figure 4:
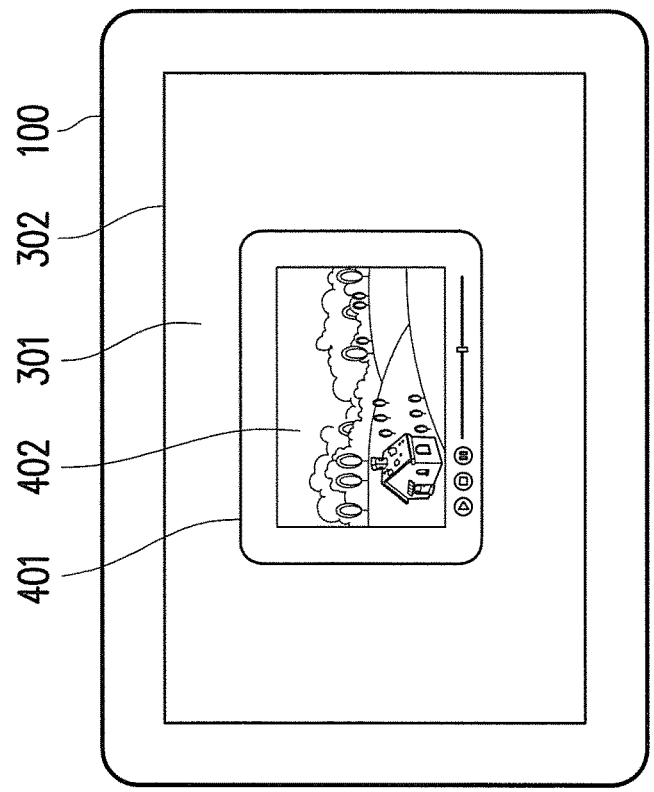

FIG. 4 is a schematic view illustrating a content sharing method according to another exemplary embodiment of the invention. Referring to FIG. 4, in another exemplary embodiment, the content sharing unit 240 may also transmit an audio and video content 402 played by an application 401 operated on the master electronic device 100 to the first slave electronic device 200, and plays the audio and video content 402 on the display screen 303 of the first slave electronic device 200. In other words, when the application 401 of the master electronic device 100 plays the audio and video content 402, the audio and video content 402 may be directly shared to the first slave electronic device 200 by using the content sharing method of this exemplary embodiment, and it is not necessary to synchronously project the frame 301 of the master electronic device 100 to the first slave electronic device 200 to display.

For example, when the user plays a film in the master electronic device 100, the audio and video content 402 of the film being played may be automatically displayed on the display screen 303 of the first slave electronic device 200. In other words, what is directly viewed by the user on the display screen 303 of the first slave electronic device 200 is the audio and video content 402, instead of the frame 301 illustrating the current operating environment of the master electronic device 100 or the application 401.

Figure 5:
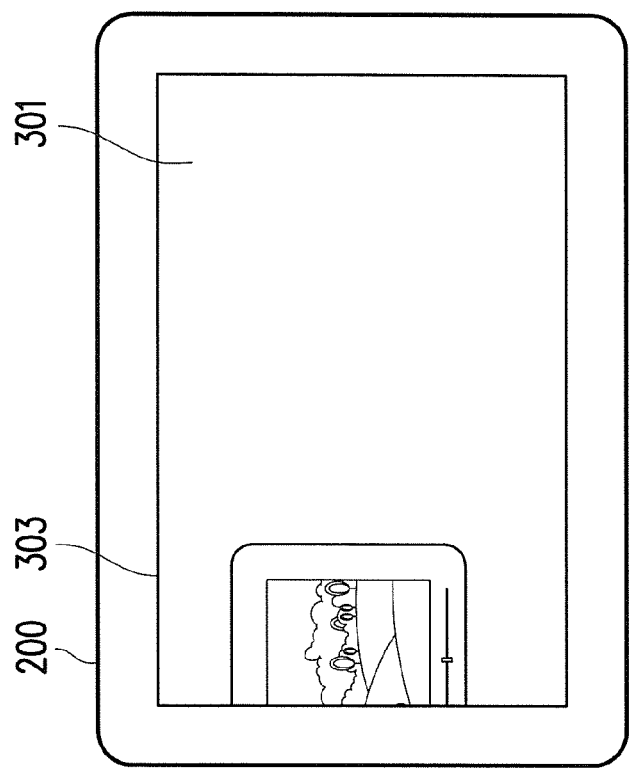
FIG. 5 is a schematic view illustrating a content sharing method according to another exemplary embodiment of the invention.
Figure 5:
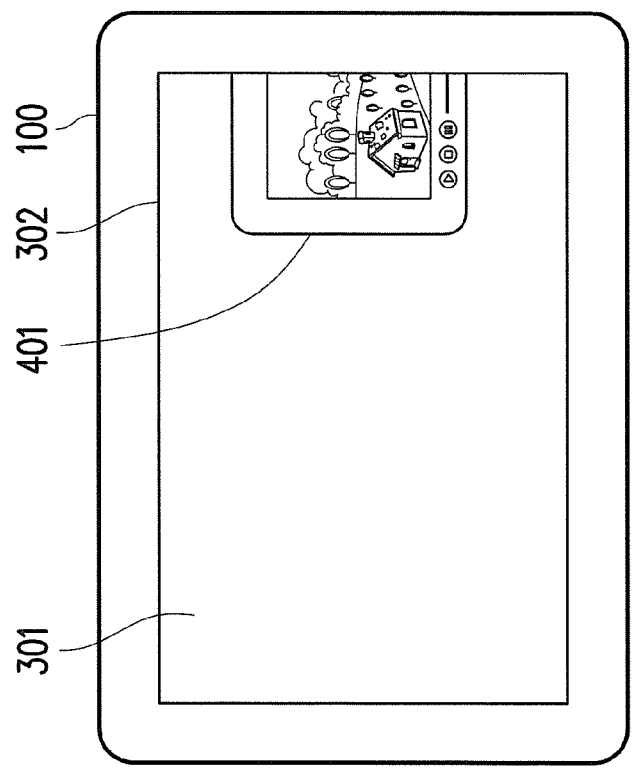

FIG. 5 is a schematic view illustrating a content sharing method according to another exemplary embodiment of the invention. Referring to FIGS. 4 and 5, in another exemplary embodiment, the content sharing unit 240 may also perform an extended mode. For example, an extended frame corresponding to the frame displayed on the display screen 302 of the master electronic device 100 is displayed on the display screen 303 of the first slave electronic device 200. In other words, when the wireless connection with the first slave electronic device is built up, the user may also manually choose the extended mode, in addition to automatically and synchronously displaying the mirror frame of the master electronic device on the first slave electronic device (as the example shown in FIG. 3, i.e., execute the mirror mode), so as to extend the frame 301 displayed on the master electronic device 100 to the display screen 303 of the first slave electronic device 200. By using the extended mode, the user may drag or operate the application 401 on the display screen 302 of the master electronic device 100 or the display screen 303 of the first slave electronic device 200.

For example, in the example that the frame 301 of the master electronic device 100 displays the application 401 playing the audio and video content 402 (as shown in FIG. 4), when the user chooses to execute the extended mode, the frame 301 of the master electronic device 100 may be extended to the display screen 303 of the first slave electronic device 200. After the extended mode is executed, the frame displayed on the display screen 303 of the first electronic device 200 becomes a part (also called an extended frame corresponding to the frame displayed on the display screen 302 of the master electronic device 100) of the frame 301 displayed on the master electronic device 100 shown in FIG. 4. In other words, the display screen 302 of the master electronic device and the display screen 303 of the first slave electronic device 200 together display the whole frame 301.

Figure 6:
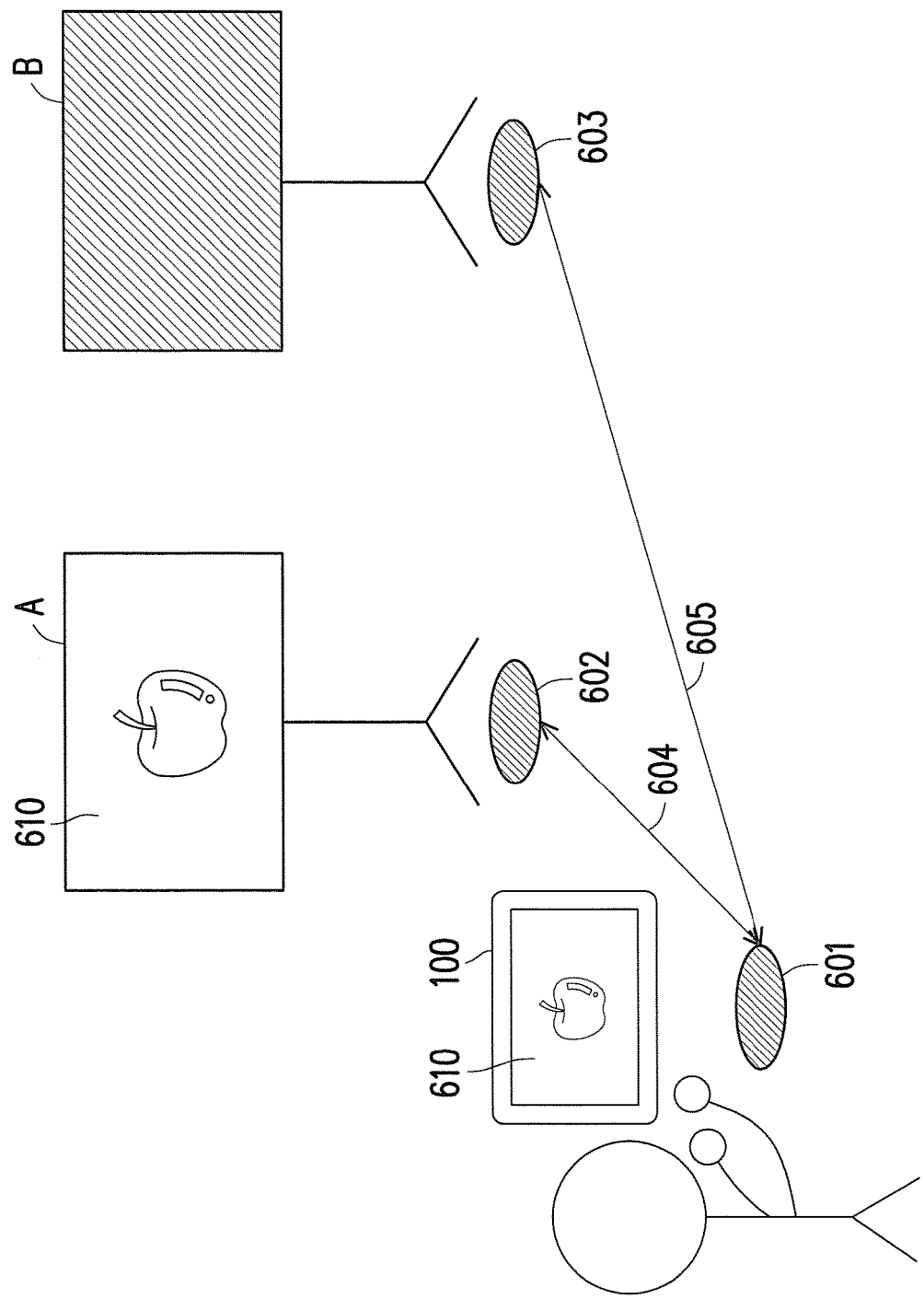
FIGS. 6 and 7 are conceptual schematic views illustrating a content sharing method according to another exemplary embodiment of the invention.
Figure 7:
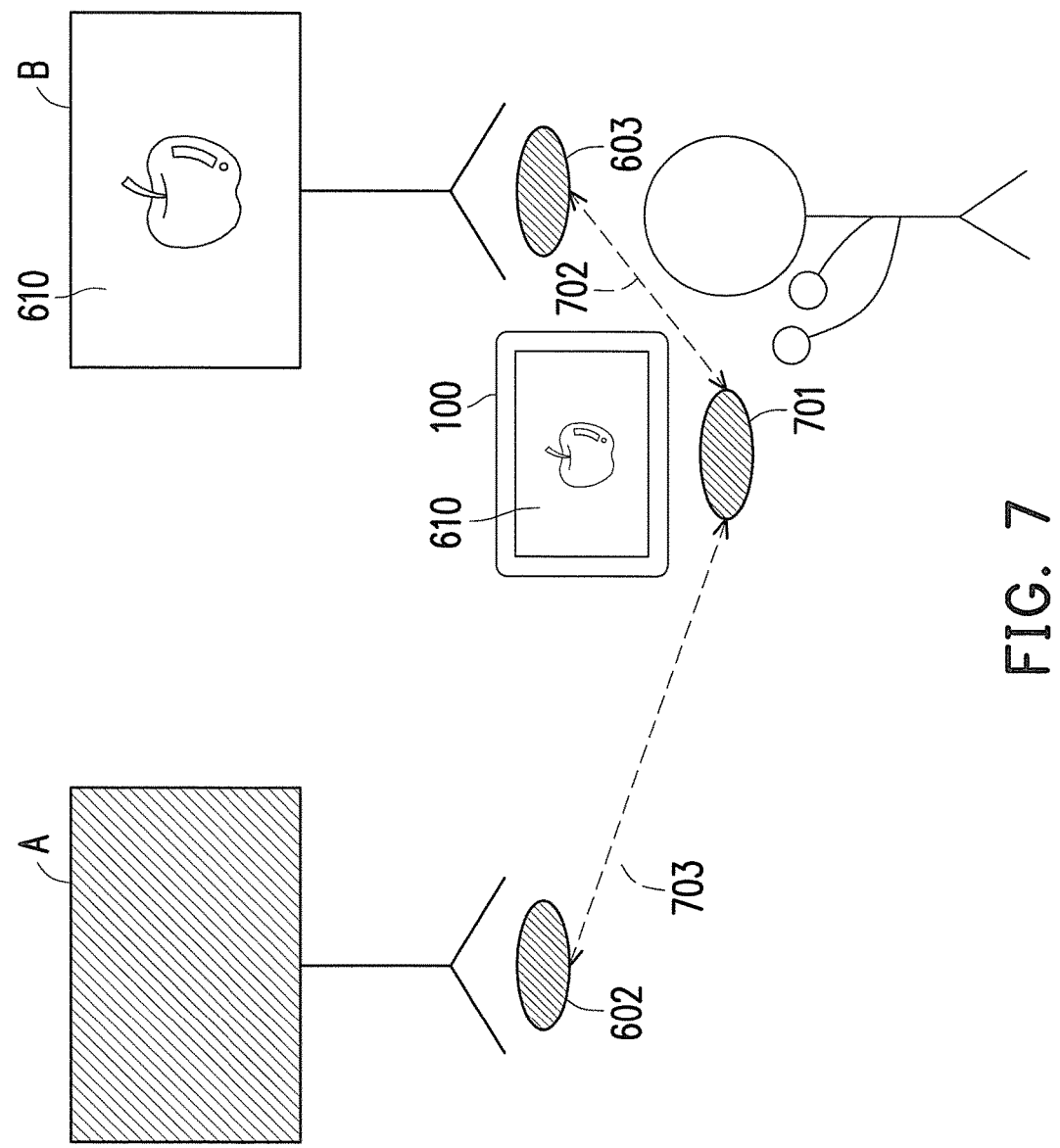

FIGS. 6 and 7 are conceptual schematic views illustrating a content sharing method according to another exemplary embodiment of the invention. Referring to FIG. 6, according to the data sharing method, the shorter the distance from the master electronic device, the stronger the strength of the wireless signal emitted from the slave electronic device is determined to be. For example, assuming that there are two slave electronic devices, slave electronic devices A and B, a distance 604 between a position 602 of the slave electronic device A and a position 601 of the master electronic device 100 is shorter than a distance 605 between a position 603 of the slave electronic device B and the position 601 of the master electronic device 100. Thus, according to the content sharing method of the invention, a content 610 displayed on the master electronic device 100 is automatically transmitted to the slave electronic device A, and the content 610 is synchronously displayed on the electronic device A.

Referring to FIG. 7, when the master electronic device 100 is moved to a position 701 closer to the slave electronic device B (i.e., a distance 702 between the position 603 of the slave electronic device B and the position 701 of the master electronic device 100 is shorter than a distance 703 between the position 601 of the slave electronic device A and the position 701 of the master electronic device 100), the content 610 played in the master electronic device 100 is then automatically transmitted to the slave electronic device B and synchronously displayed on the slave electronic device B according to the content sharing method of the exemplary embodiment, and is synchronously displayed on the slave electronic device B. In other words, when the slave electronic device closer to the master electronic device 100 changes from the slave electronic device A shown in FIG. 6 to the slave electronic device B shown in FIG. 7, the content sharing unit 240 of the master electronic device 100 automatically turns off the wireless connection with the slave electronic device A, and builds up the wireless connection with the currently closest slave electronic device B, so as to synchronously display the content 610 on the slave electronic device B.

In an exemplary embodiment, the communication unit 230 may respectively build up a user input back channel session with the first slave electronic device 200, and respectively receive the control signals through the user input back channel session. The content sharing unit 240 synchronously controls the content (i.e., the first frame) played in the master electronic device 100 according to the control signals. Specifically speaking, when the communication unit 230 builds up the wireless connection, the communication unit 230 may also build up a connection for the user input back channel (e.g., performing processes such as capability negotiation, renewal of user input back channel, etc.) according to a user input back channel protocol.

For example, the communication unit 230 turns on a network socket to receive the control signals (e.g., cursor movement, keyboard input, gesture input, remote control, etc.) from the first slave electronic device 200. The content sharing unit 240 may control the corresponding first frame according to the control signals and the user input back channel session. Accordingly, the master electronic device 100 may mutually interact with the first slave electronic device 200. Taking teaching as an example, a student may express his/her thoughts or ideas on a tablet computer controlled by an educator (i.e., the master electronic device) by using his/her tablet computer (first slave electronic device). It should be noted that the methods of the control signals may vary in accordance with hardware or software requirement of the user input back channel compatible with the master electronic device 100 and the first slave electronic device 200, and may be determined according to the design requirement. The invention does not intend to impose a limitation on this regard.

Figure 8:
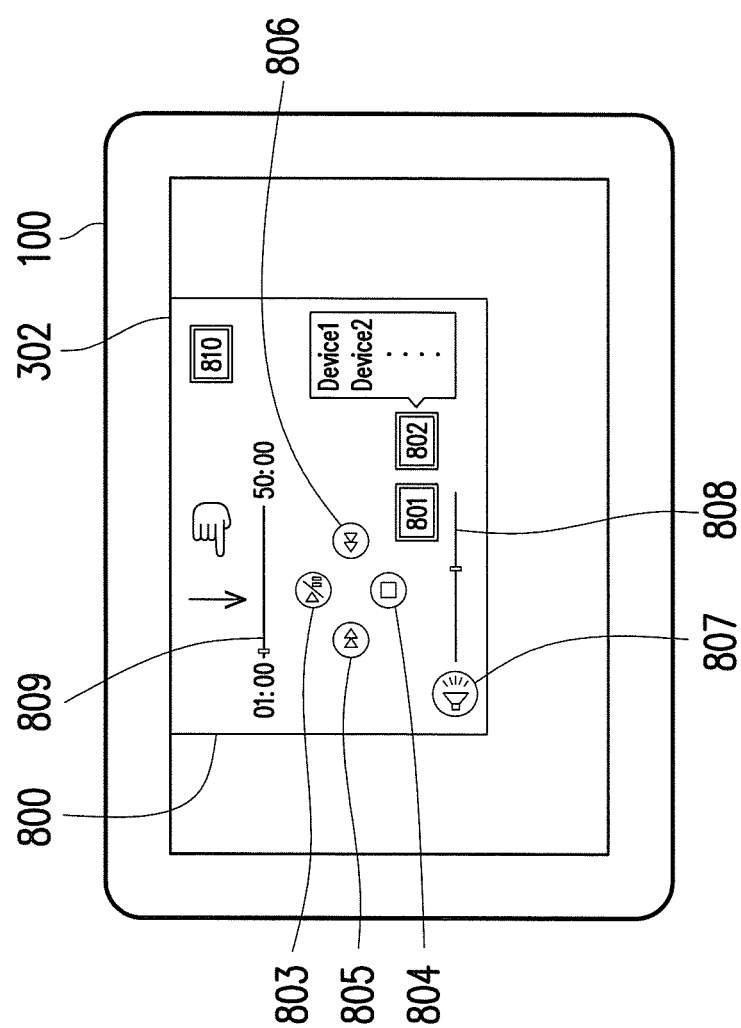
FIG. 8 is a schematic view illustrating a control panel for content sharing according to an exemplary embodiment of the invention.

FIG. 8 is a schematic view illustrating a control panel for content sharing according to an exemplary embodiment of the invention.

Referring to FIG. 8, the user may touch downwardly from the top of the display screen 302 of the master electronic device 100 to drag out a control panel 800, or use an operating gesture to access the control panel 800. In the control panel 800, when the master electronic device 100 already builds up the wireless connection with the first slave electronic device 200, a button 801 becomes visible. Also, an icon of the button 801 may indicate whether the frame synchronously displayed on the first slave electronic device 200 is a mirror frame or an extended frame. In other words, the icon of the button 801 indicates whether the currently used mode is the extended mode or the mirror node. By long pressing the button 801, the frame synchronously displayed on the first slave electronic device 200 may be switched between the mirror mode and the extended mode. When the user clicks on a button 802, a list may show up. The list displays the currently found electronic devices, so that the user may choose a slave electronic device to be connected from the list, or turn off the wireless connection with the currently connected slave electronic device. A button 810 is a button for switching the WFD function. An icon on the button indicates whether the WFD function is turned on or off. For example, the user may turn on or off the WFD function by triggering the button 801. Details in this operation are already described above. Therefore, no further details will be reiterated in the following.

In addition, the control panel 800 also includes a plurality of buttons having multimedia functions or a plurality of status bars, such as buttons 803, 804, 805, 806, 807, and status bars 808 and 809. For example, the button 803 may be used to play or pause the content played in the master electronic device. The user may choose a content to be played in the master electronic device through a file management application by long pressing the button 803. The button 804 is used to stop the content being played. The button 805 is used to rewind the content being played. The button 806 is used to forward the content being played. The button 807 is used to turn on/off a sound effect of the content being played. The status bar 808 is used to display and adjust a volume of the content being played. The status bar 809 is used to display and adjust a time course of the content being played. It should be noted that the configuration of the control panel merely serves to explain that the invention also offers functions of making a choice manually, and does not serve to limit the invention.

Figure 9:
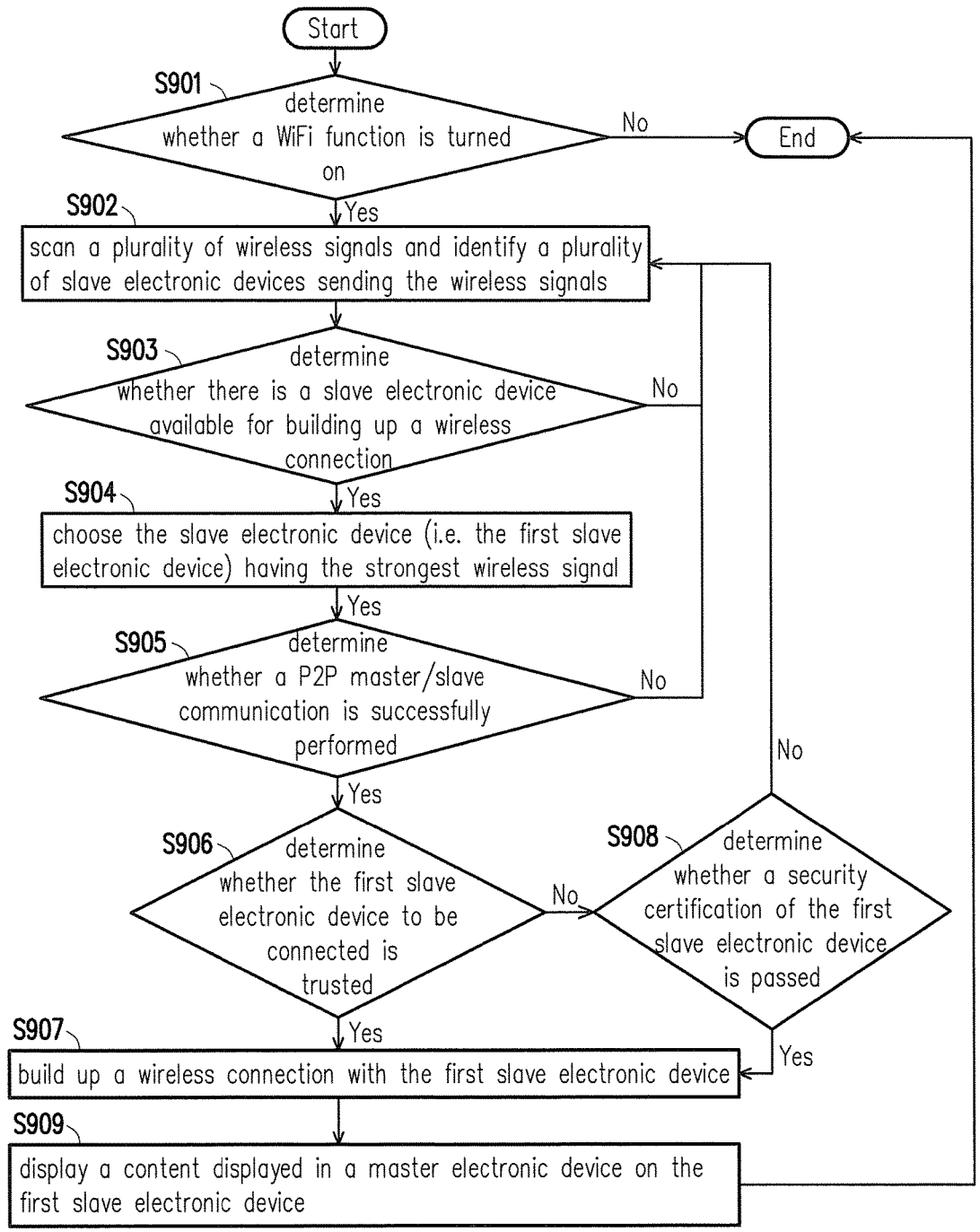
FIG. 9 is a flowchart illustrating a content sharing method according to an exemplary embodiment of the invention.

FIG. 9 is a flowchart illustrating a content sharing method according to an exemplary embodiment of the invention. Referring to FIG. 9, at Step S901, the content sharing unit 240 determines whether the WiFi function is turned on. If the WiFi function is not turned on, the procedure shown in FIG. 9 is terminated. If the WiFi function is turned on, at Step S902, the content sharing unit 240 may instruct the communication unit 230 to scan the plurality of wireless signals and identify the plurality of slave electronic devices sending the wireless signals. At Step S903, the content sharing unit 240 determines whether there is a slave electronic device available for building up the wireless connection. If there is no slave electronic device available for building up the wireless connection, Step S902 is performed. If there is a slave electronic device available for building up the wireless connection, at Step 904, the content sharing unit 240 chooses the slave electronic device (i.e., the first slave electronic device) having the strongest wireless signal strength. At Step S905, the content sharing unit 240 determines whether the P2P master/slave communication is successfully performed. Details concerning the P2P mater/slave communication are already described above. Therefore, no further details in this respect will be reiterated in the following. If the P2P master/slave communication is not successfully performed, Step S902 is performed. If the P2P master/slave communication is successfully performed, at Step S906, the content sharing unit 240 determines whether the first slave electronic device to be connected is trusted. If the first slave electronic device to be connected is trusted, at Step S907, the wireless connection with the first slave electronic device is built up. If the first slave electronic device to be connected is not trusted, at Step S908, the content sharing unit 240 may determine whether the security certification of the first slave electronic device is passed. If the security certification of the first slave electronic device is not passed, Step S902 is performed. If the security certification of the first slave electronic device is passed, Step S907 is performed. At Step 909, the content played in the master electronic device is played in the first slave electronic device. The procedure in the flow of FIG. 9 may be adjusted according to the actual practice, and is not limited to the description above.

Figure 10A:
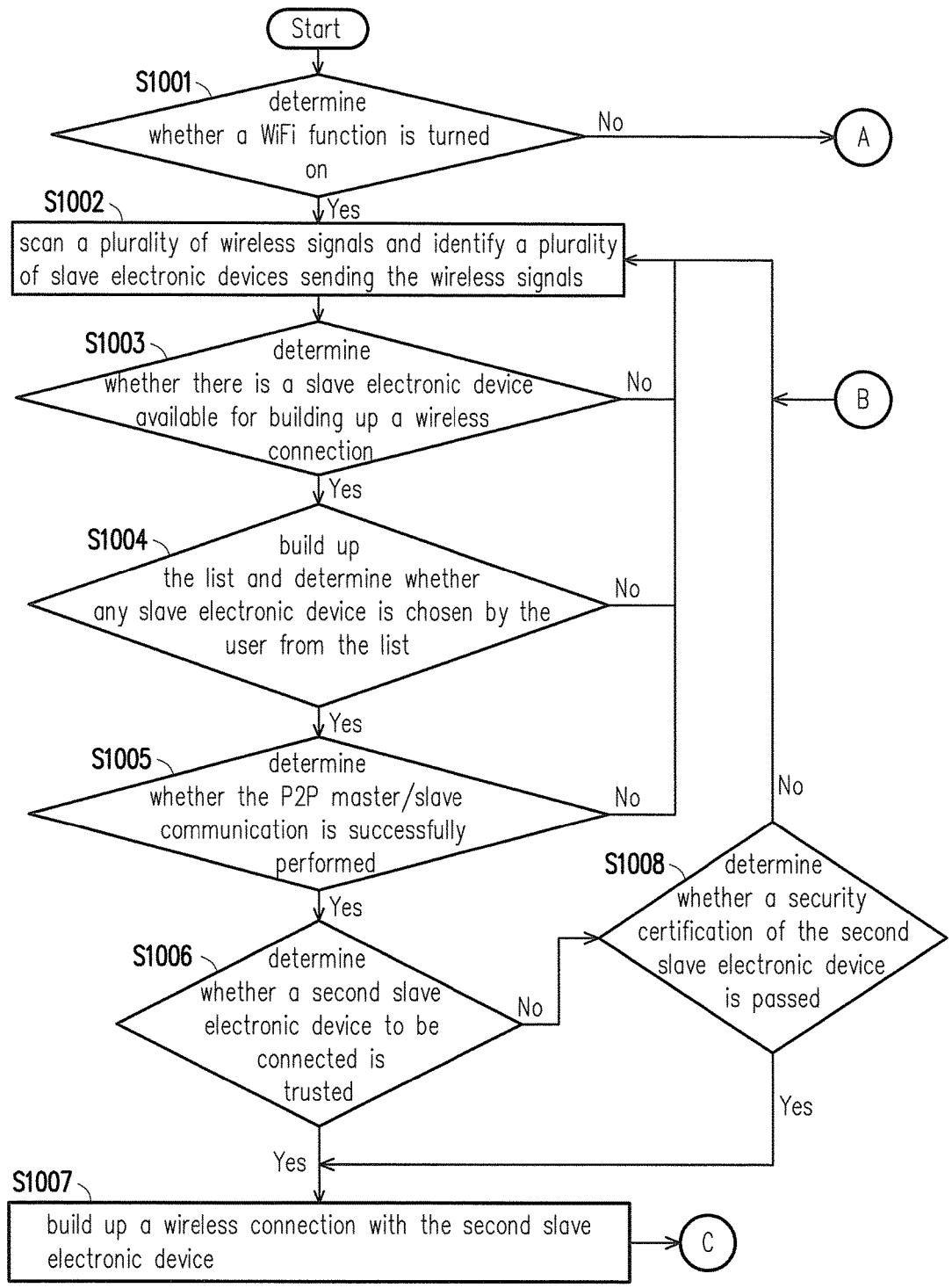
FIGS. 10A and 10B are a flowchart illustrating a content sharing method according to another exemplary embodiment of the invention.
Figure 10B:
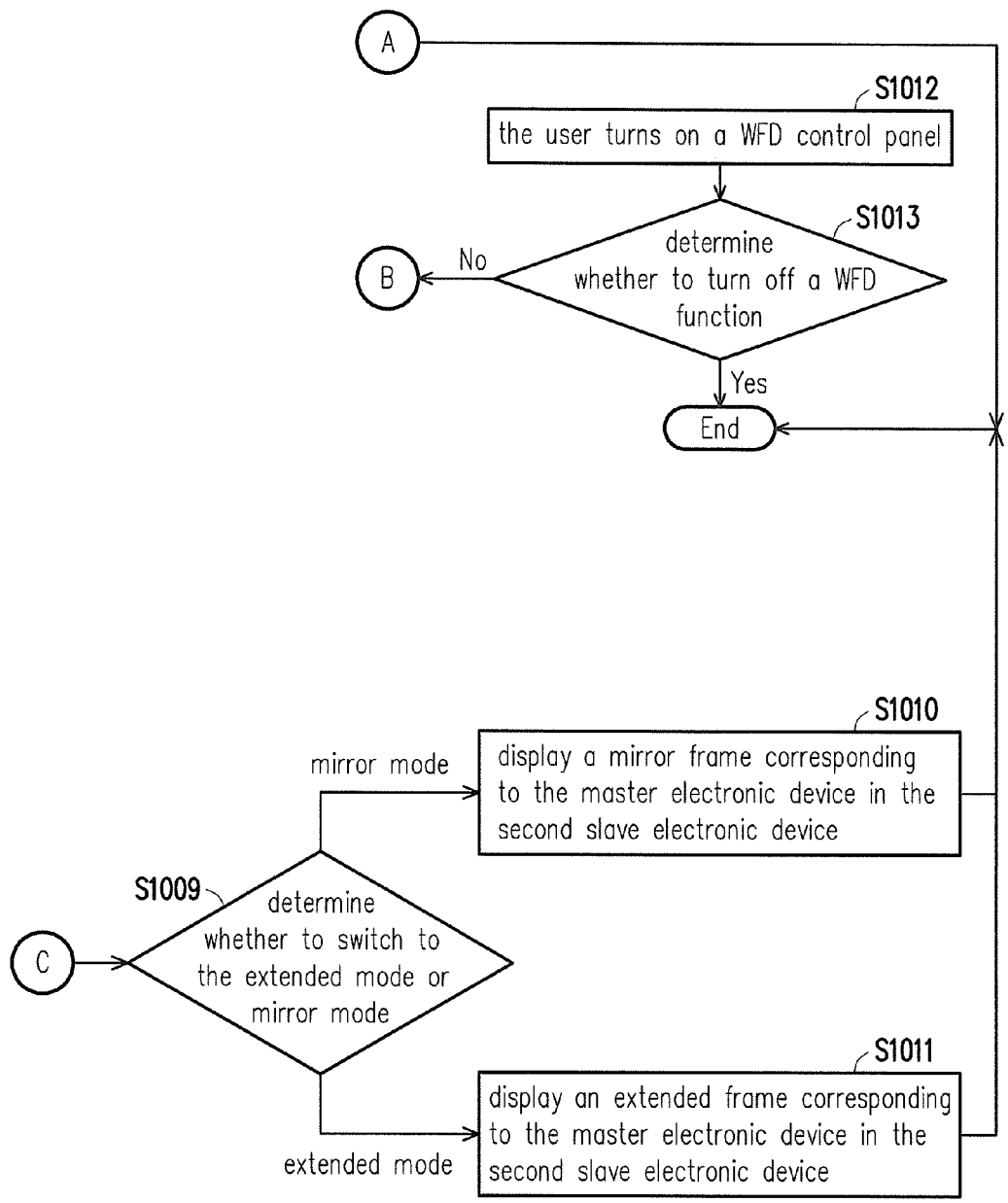

FIGS. 10A and 10B are a flowchart illustrating a content sharing method according to another exemplary embodiment of the invention, wherein a procedure of the content sharing method allowing the user to perform manual control to the master electronic device is described.

Referring to FIGS. 10A and 10B, at Step S1001, the content sharing unit 240 determines whether the WiFi function is turned on. If the WiFi function is not turned on, the procedure shown in FIG. 10 is terminated. If the WiFi function is turned on, at Step S1002, the content sharing unit 240 may instruct the communication unit 230 to scan the plurality of wireless signals and identify the plurality of slave electronic devices sending the wireless signals. At Step S1003, the content sharing unit 240 determines whether there is a slave electronic device available for building up the wireless connection. If there is a slave electronic device available for building up the wireless connection, at Step S1004, the content sharing unit 240 builds up the list and determines whether any slave electronic device is chosen by the user from the list. It should be noted that relevant details concerning the list are already described above, and no further details in this respect will be reiterated in the following. If there is no slave electronic device available for building up the wireless connection at Step S1003 or no slave electronic device is chosen at Step S1004, Step S1002 is performed. If a slave electronic device (the second slave electronic device) is chosen at Step S1004, the content sharing unit 240 may determine whether the P2P master/slave communication is successfully performed at Step S1005. If the P2P master/slave communication is not successfully performed, Step S1002 is performed. If the P2P master/slave communication is successfully performed, at Step S1006, the content sharing unit 240 may determine whether the second slave electronic device to be connected is trusted. If the second slave electronic device is trusted, at Step S1007, the wireless connection with the second slave electronic device is built up. If the second slave electronic device is not trusted, at Step S1008, the step sharing unit 240 may determine whether the security certification of the second slave electronic device is passed. If the security certification of the second slave electronic device is not passed, Step S1002 is performed. If the security certification of the second slave electronic device is passed, Step S1007 is performed. Then, at Step S1009, the content sharing unit 240 determines whether to switch to the extended mode or the mirror mode. If it is determined to switch to the mirror mode, at Step S1010, the content sharing unit 240 displays the mirror frame corresponding to the master electronic device on the second slave electronic device. If it is determined to switch to the extended mode, at Step S1011, the content sharing unit 240 displays the extended fame corresponding to the master electronic device on the second slave electronic device. At Step S1012, the control panel of the WFD is turned on by the user. Details concerning the control panel are already described above. Therefore, no further details in this regard will be reiterated in the following. At Step 1013, the content sharing unit 240 may determine whether to turn off the WFD function. If it is determined to turn off the WFD function, the content sharing is ended. If it is determined not to turn of the WFD function, Step 1002 is performed.

It should be noted that while the content sharing unit 240 is implemented as a hardware circuit in the exemplary embodiment, the invention is not limited thereto. The function of the content sharing unit 240 may be implemented with programming codes or software. For example, the function of the content sharing unit 240 may be implemented as a content sharing module formed of a plurality of programming commands, including a wireless signal strength calculating module, a data projecting module, and a data encode/decode module. In addition, the content sharing module may be performed by the processing unit 220 to perform and complete the function of the content sharing unit 240.

In view of the foregoing, the content sharing unit of the invention looks for the slave electronic devices available for connection through the communication unit. The content sharing unit also chooses the second slave electronic device to be projected and builds up the wireless connection according to a selecting operation of the user of the master electronic device on the display unit of the master electronic device. Alternatively, the content sharing unit may automatically choose the first slave electronic device having the closest distance to build up the wireless connection according to the signal strengths of the slave electronic devices available for connection that are found or the distances between the slave electronic devices and the master electronic device. Then, the content sharing unit synchronously displays the first frame displayed on the master device on the chosen slave master device through the wireless connection between the master electronic device and the slave electronic device built up by the communication unit. In addition, the master electronic device of the invention also receives the control signals from the slave electronic device through the user input back channel session, so that the master and slave electronic devices may interact with each other. In this way, the user is able to synchronously display the content (video, music, images, webpages, etc.) displayed on the master electronic device on the slave electronic device. For the purpose of teaching, the educator is able to share the frame of the electronic whiteboard to the tablet computer of the student, and the electronic whiteboard also offers a convenient interactive learning mode. For the purpose of conference meetings, the speaker may project his/her report in his/her own device to a large-scale display device, and have a real-time discussion with the participants through the large-scale display device and the device of the speaker.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A content sharing method for a master electronic device, the content sharing method comprising:
   scanning a plurality of wireless signals and identifying a plurality of slave electronic devices sending the wireless signals, wherein each of the wireless signals is sent from one of the slave electronic devices;
   calculating a wireless signal strength corresponding to each of the slave electronic devices according to the wireless signals;
   building up a wireless connection with a first slave electronic device when the first slave electronic device is determined as trusted, wherein the wireless signal strength corresponding to the first slave electronic device is stronger than rest of the wireless signal strengths;
   automatically transmitting a content being played on the master electronic device to the first slave electronic device through the wireless connection, and synchronously displaying the content on a display screen of the first slave electronic device;
   creating a slave electronic device list according to the wireless signals and the slave electronic devices sending the wireless signals;
   receiving a selection of a second slave electronic device from the slave electronic device list,
   determining whether the second slave electronic device is trusted; and
   in response to the second slave electronic device is determined as trusted,
   disconnecting the wireless connection connecting with the first slave electronic device, building up another wireless connection with the second slave electronic device, automatically transmitting the content played in the master electronic device to the second slave electronic device through the another wireless connection, and synchronously displaying the content on the second slave electronic device when the content is received by the second slave electronic device.

2. The content sharing method as claimed in claim 1, wherein the wireless signal strengths of the slave electronic devices are WiFi received signal strength indicators.

3. The content sharing method as claimed in claim 1, wherein the step of transmitting the content being played on the master electronic device to the first slave electronic device and synchronously displaying the content on the display screen of the first slave electronic device comprises:
   transmitting a mirror frame corresponding to a frame displayed on a display screen of the master electronic device to the first slave electronic device, and synchronously displaying the mirror frame on the display screen of the first slave electronic device.

4. The content sharing method as claimed in claim 1, wherein the step of transmitting the content being played on the master electronic device to the first slave electronic device and synchronously displaying the content on the display screen of the first slave electronic device comprises:
   transmitting an audio and video content played by an application operated on the master electronic device to the first slave electronic device and displaying the audio and video content on the display screen of the first slave electronic device.

5. The content sharing method as claimed in claim 1, wherein the step of transmitting the content being played on the master electronic device to the first slave electronic device and synchronously displaying the content on the display screen of the first slave electronic device comprises:
   displaying an extended frame on the display screen of the first slave electronic device corresponding to a frame displayed on a display screen of the master electronic device.

6. The content sharing method as claimed in claim 1, wherein the step of building up the wireless connection with the first slave electronic device comprises:
   determining whether the master electronic device already stores a personal identification code corresponding to the first slave electronic device;
   if the master electronic device does not store the personal identification code corresponding to the first slave electronic device, sending a personal identification code request and receiving the personal identification code corresponding to the first slave electronic device; and
   if the master electronic device already stores the personal identification code corresponding to the first slave electronic device, using the personal identification code corresponding to the first slave electronic device to build up the wireless connection with the first slave electronic device.

7. The content sharing method as claimed in claim 1, wherein the wireless connection is a WiFi Direct connection.

8. The content sharing method as claimed in claim 1, wherein the step of transmitting the content being played on the master electronic device to the first slave electronic device through the wireless connection, and synchronously displaying the content on the display screen of the first slave electronic device comprises:

building up a real-time streaming protocol session with the first slave electronic device on the wireless connection;

encoding the content to generate an encoded data; and through the real-time steaming protocol session, transmitting the encoded data to the first slave electronic device, wherein the first slave electronic device decodes the encoded data to play the content.

9. The content sharing method as claimed in claim 1, further comprising:

building up a user input back channel (UIBC) session with a user of the first slave electronic device;

receiving a plurality of control signals from the first slave electronic device through the user input back channel session; and controlling the content being played on the master electronic device according to the control signals.

10. A content sharing device, comprising:

a display unit, displays a content on a display screen of the content sharing device;

a communication unit; and a content sharing unit coupled to the display unit and the communication unit, wherein the content sharing unit instructs the communication unit to scan a plurality of wireless signals and identify a plurality of slave electronic devices sending the wireless signals, and each of the wireless signals is sent from one of the slave electronic devices, wherein the content sharing unit calculates a wireless signal strength corresponding to each of the slave electronic devices according to the wireless signals, wherein the content sharing unit instructs the communication unit to build up a wireless connection with a first slave electronic device when the first slave electronic device is determined as trusted, wherein the wireless signal strength corresponding to the first slave electronic device is stronger than rest of the wireless signal strengths, wherein the content sharing unit automatically transmits a content being played on the content sharing device to the first slave electronic device through the wireless connection and synchronously displays the content on a display screen of the first slave electronic device, wherein the content sharing unit creates a slave electronic device list according to the wireless signals and the slave electronic devices sending the wireless signals, wherein if a second slave electronic device is selected from the slave electronic device list, the content sharing unit determines whether the second slave electronic device is trusted, wherein in response to the second slave electronic device is determined as trusted, the content sharing unit disconnects the wireless connection connecting with the first slave electronic device, instructs the communication unit to build up another wireless connection with the second slave electronic device, and automatically transmits the content being played on the content sharing device to the second slave electronic device through the another wireless connection, and wherein when the content is received by the second slave electronic device, a display screen of the second slave electronic device synchronously displays the content.

11. The content sharing device as claimed in claim 10, wherein the wireless signal strengths of the slave electronic devices are WiFi received signal strength indicators.

12. The content sharing device as claimed in claim 10, wherein the content sharing unit transmits a mirror frame corresponding to a frame displayed on the display screen of the content sharing device to the first slave electronic device and synchronously displays the mirror frame on the display screen of the first slave electronic device.

13. The content sharing device as claimed in claim 10, wherein the content sharing unit transmits an audio and video content played by an application operated on the content sharing device to the first slave electronic device and displays the audio and video content on the display screen of the first slave electronic device.

14. The content sharing device as claimed in claim 10, wherein the content sharing unit displays an extended frame on the display screen of the first slave electronic device corresponding to a frame displayed on the display screen of the content sharing device.

15. The content sharing device as claimed in claim 10, wherein the content sharing unit determines whether the content sharing device already stores a personal identification code corresponding to the first slave electronic device, wherein if the content sharing device does not store the personal identification code corresponding to the first slave electronic device, the content sharing unit sends a personal identification code request and receives the personal identification code corresponding to the first slave electronic device, and wherein if the content sharing device already stores the personal identification code corresponding to the first slave electronic device, the content sharing device instructs the communication unit to build up the wireless connection with the first slave electronic device by using the personal identification code corresponding to the first slave electronic device.

16. The content sharing device as claimed in claim 10, wherein the wireless connection is a WiFi Direct connection.

17. The content sharing device as claimed in claim 10, wherein the communication unit builds up a real-time stream protocol session with the first slave electronic device on the wireless connection, wherein the content sharing unit encodes the content to generate an encoded data, wherein the content sharing unit transmits the encoded data to the first slave electronic device through the real-time streaming protocol session, and the first slave electronic device decodes the encoded data to play the content.

18. The content sharing device as claimed in claim 10, wherein the content sharing unit builds up a user input back channel (UIBC) session with the first slave electronic device, wherein the content sharing unit receives a plurality of control signals from the first slave electronic device through the user input back channel session, and wherein the content sharing unit controls the content being played on the content sharing device according to the control signals.

* * * * *